Figure 1:
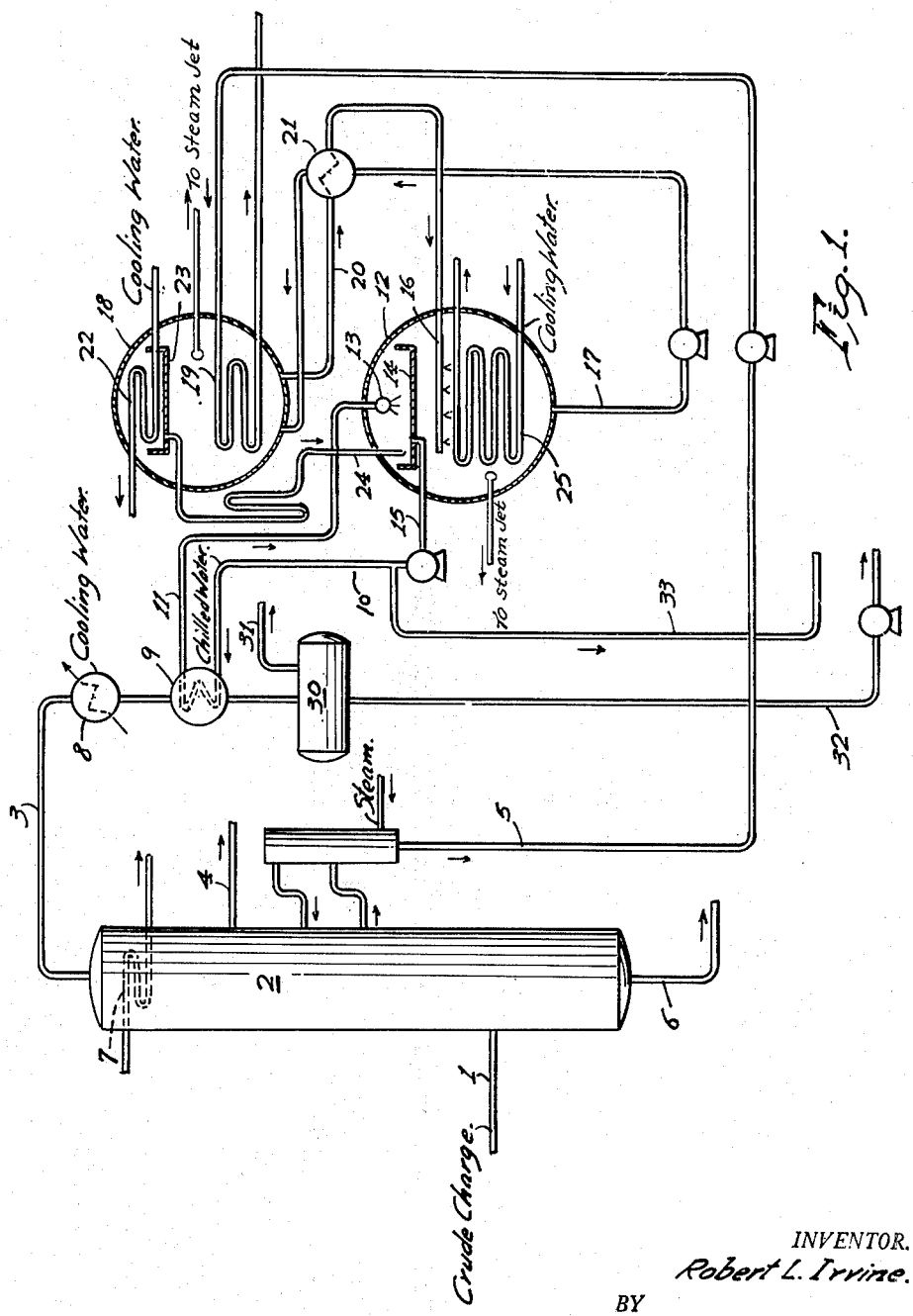

April 17, 1956  R. L. IRVINE  2,742,407
FRACTIONATION PROCESS AND APPARATUS
Filed Aug. 7, 1952  2 Sheets-Sheet 1

INVENTOR.
Robert L. Irvine.
BY
ATTORNEY:-

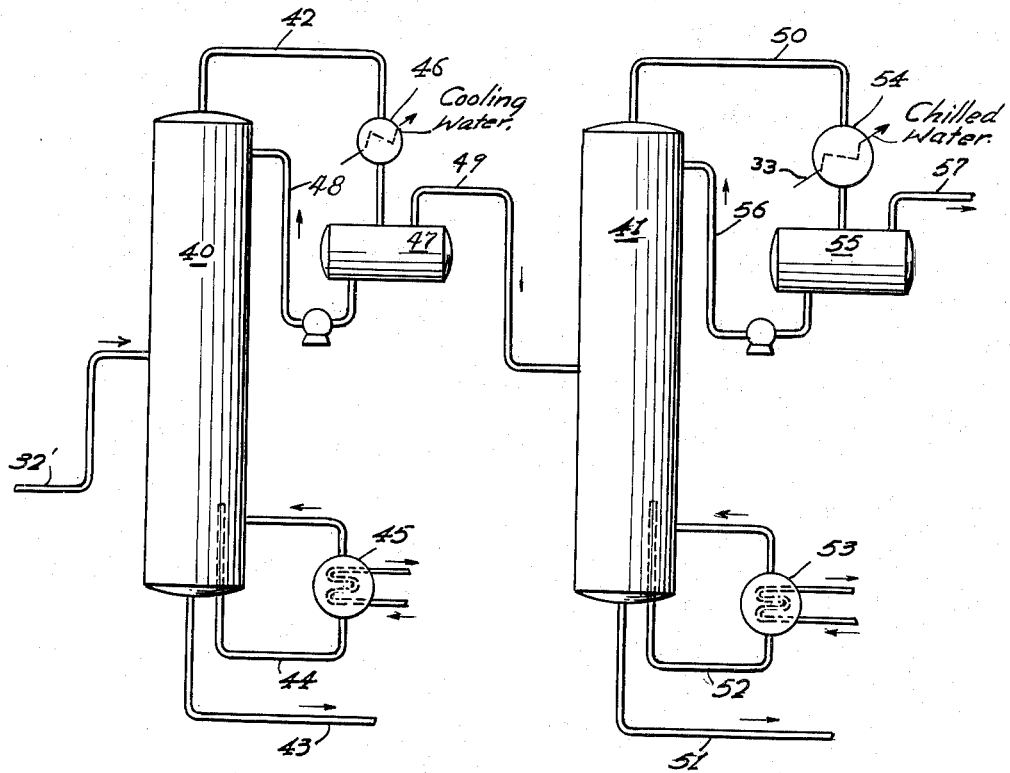

United States Patent Office 2,742,407
Patented Apr. 17, 1956

2,742,407

FRACTIONATION PROCESS AND APPARATUS

Robert L. Irvine, Belle Fons Farm, Pa., assignor to Gulf Oil Corporation, Pittsburgh, Pa., a corporation of Pennsylvania Application August 7, 1952, Serial No. 303,185

5 Claims. (Cl. 196—73)

This invention relates to fractional distillation and more particularly to a method and apparatus for the fractional distillation of fluid mixtures of wide boiling range.

A wide boiling range mixture is one in which the difference in temperature between the initial boiling point and the end boiling point is considerable. Ordinarily such mixtures contain several or many different compounds and the mixture is separated into several fractions each of which contains several or many individual compounds. When such a mixture is charged to a fractionating column the column will produce an overhead vapor fraction, one or more liquid side stream fractions and a bottom or residual fraction. Usually the temperature difference between the top and bottom of the column in fractionating such a mixture is large, e. g. 50 to several hundred degrees Fahrenheit. The liquid product streams, and especially those from the lower portion of the column are thus considerably hotter than the overhead product.

The distillation of wide boiling range mixtures by conventional methods usually provides for cooling the overhead product with available cooling water then compressing non-condensables and recooling them, the reason being that a wide boiling range mixture normally includes materials of such low-boiling points that condensation will not take place at normal cooling water temperatures and atmospheric pressure. Another known procedure involves the use of high pressures in the fractionating column to cause overhead product condensation at cooling water temperatures. Still another known method of fractionating wide boiling mixtures involves the refrigeration of the overhead condenser by conventional compression refrigeration equipment.

The process of the present invention eliminates the expensive wet gas compression and recontacting which is commonly practiced with atmospheric towers using available cooling water. It also avoids the use of high tower pressures and the expense of heavy equipment for withstanding high pressures. Furthermore, the present process accomplishes refrigeration of the overhead condenser without the excessive operating expense of conventional compression refrigeration.

The process and apparatus of the present invention are applicable for the fractionation of wide boiling range fluid mixtures which contain either a few or many individual constituents but they have their most important application for fractionating such wide boiling range mixtures as crude petroleum oil and synthetic crudes such as the effluent from a fluid catalytic cracking unit. The process and apparatus can be most conveniently described by reference to the accompanying drawings.

Figure 1 of the drawings is a diagrammatic representation of a crude oil fractionation column in combination with absorption refrigeration equipment.

Figure 2 of the drawings is a diagrammatic representation of additional fractionation columns used in combination with the column and refrigeration system of Figure 1.

In the apparatus of Figure 1, crude oil to be fractionated is continuously introduced through line 1 into fractionating column 2 and is subjected to conventional atmospheric fractionation therein. The more volatile constituents of the charge mixture are continuously withdrawn as a vapor from the top of the column through line 3. The less volatile constituents are withdrawn as liquid side streams through line 4 and line 5 or other side stream lines not shown in the drawing. The residual product is withdrawn from the bottom of the column by line 6. In the upper portion of column 2 are cooling tubes 7 through which a cooling medium such as cooling water or crude oil charge is passed to cool the top of the tower and assist in the rectification of the mixture being fractionated.

The vapors passing overhead from column 2 via line 3 are first cooled and partially condensed in a condenser 8 through which cooling water is passed and are then further cooled to a considerably lower temperature and further condensed in a refrigerated overhead condenser 9 by indirect heat exchange with an evaporating refrigerant. From condenser 9 the overhead product passes to separator drum 30 from which non-condensables are vented by line 31 and overhead product condensate is withdrawn through line 32 for storage or further fractionation.

Figure 1 shows the preferred embodiment of my process and apparatus in which the heat exchange is carried out by passing through the tubes of condenser 9 a stream of chilled liquid delivered from a refrigerant evaporating zone. In the preferred embodiment of the invention which will be described with reference to the drawing, water is used as the evaporating refrigerant and as the chilled heat exchange liquid. Advantages of the use of water for both purposes will be apparent from the description of the process and apparatus.

The temperature of the overhead condenser 9 when chilled water is the refrigerating medium is from about 40° to about 50° F. as compared with about 85° to 120° F. when normal temperature cooling water is used in the overhead condenser. This substantial reduction in condenser temperature makes it possible to maintain the flash section of tower 2 at from 50° to 100° F. lower than the operating temperature when normal temperature cooling water is employed in the overhead condenser. This lower tower temperature considerably reduces the necessary preheating of the charge stock. The charge stock, crude oil in the embodiment of the drawing, can be introduced to the tower at from about 50° to 100° F. below the usual charge temperature. In addition, the low overhead condenser temperature results in such a high degree of condensation of overhead product that compression and recontacting of uncondensed gas is not necessary. In this way the expense of the conventional crude oil fractionation process is considerably reduced.

The various advantages obtained by refrigerating the overhead condenser are made possible in my process without substantial added expense for the refrigeration since refrigeration in my process is accomplished with a heat operated refrigerating system which is operated by waste heat from a fractionating column side stream. Thus, as the drawing shows, the chilled water introduced by line 10 for refrigerating the overhead condenser is returned by line 11 to the refrigerant evaporating zone in the upper portion of shell 12. The water is sprayed through the header 13 in the exaporating zone and collects in the evaporator tank 14. At the start of the process a partial vacuum is imposed in the shell 12 by conventional vacuum producing means such as a steam jet, not shown in the drawing, to promote the vaporization of refrigerant introduced into the evaporation zone. A portion of the water sprayed through header 13 flashes into vapor upon entering the low pressure evaporation zone and chills the remaining liquid. The temperature to which the water is chilled in the evaporation zone corresponds nearly to the temperature of water having a vapor pressure equal to the pressure in the shell. The chilled liquid which collects in tank 14 is withdrawn through line 15 for return through line 10 to the condenser 9 or for passage to other refrigerating loads through line 33.

The water vapor formed in the evaporation zone of shell 12 is absorbed substantially as rapidly as formed by a concentrated absorbent solution introduced into the absorption zone of shell 12 through the sprayer 16. In the preferred embodiment of my invention which I will describe, the absorbent solution employed is an aqueous solution of lithium bromide. By continuously absorbing the water vapor as flashed, the low pressure originally imposed in the shell is maintained. The steam jet can assist in maintaining the vacuum by purging air and non-condensables from the shell if they should enter by leakage.

The concentrated salt solution upon absorbing water vapor becomes diluted and the diluted solution is withdrawn from the bottom of shell 12 by line 17. The dilute solution must then be reconcentrated to restore its water absorbing power. This is accomplished by pumping the dilute solution by line 17 into a generating zone in the lower portion of the shell 18 where the weak solution is heated by indirect heat exchange with a hot liquid product stream from column 2 flowing through the tubes 19. Water vapor is thus evaporated from the solution and the solution is reconcentrated. Preferably, a partial vacuum is imposed in the shell 18 so that the temperature required to vaporize water from the diluted absorbent solution will not be too high. The low pressure can be imposed and maintained in any suitable manner, for example as in shell 12 by means of a steam jet purge system not shown in the drawing.

Reconcentrated solution is withdrawn from the bottom of shell 18 by line 20 and, after heat exchange in exchanger 21 with cooler entering weak solution, is returned to the absorption zone of shell 12 through sprayer 16 for further absorption of water vapor. Water vapor generated in the shell 18 condenses in a condensing zone in the upper portion of shell 18 by contact with the cooling coil 22 through which cooling water is passed. Condensed water collects in the condensate tank 23 and is returned by line 24 to the evaporator tank 14 in shell 12.

Because of the heats of condensation and dilution which tend to raise the temperature of the lithium bromide solution, it is preferred to provide in shell 12 a cooling means such as cooling coil 25, through which cooling water is passed, for cooling the absorbent solution to maintain its absorptive power at a high level.

From the foregoing description it can be seen that my invention makes it possible to refrigerate the overhead condenser of a column for fractionating a liquid of wide boiling point range, such as crude oil, without the excessive expense of conventional compression refrigeration equipment. The apparatus of my invention employs refrigeration equipment which is operated from low level heat which would normally be wasted in the fractionation process. As a result, the expense of compression and recontacting of uncondensed wet gases as practiced in conventional atmospheric fractionations of crude oil is eliminated and the necessary preheating of the charge is considerably reduced.

In the particular embodiment of the apparatus and process of my invention which I have described, water is used as the refrigerant and as the liquid medium for heat exchange between the evaporation zone and the overhead condenser. It should be understood, however, that while this is the preferred method of operation, other procedures can be used. Thus, for example, it is possible to condense the overhead product in tubes passing through the evaporation zone, in effect making the evaporation zone serve directly as the overhead condenser and eliminating the need for delivering a chilled liquid from the evaporation zone to a separate overhead condenser.

Another possible modification of the process is the employment of a heat exchange medium other than water for refrigerating the overhead condenser. Thus it is possible to provide coils in the evaporation zone through which brine or other heat transfer medium is flowed and chilled for delivery to the overhead condenser. In such case the brine stream would be a separate closed system and the chilling effect would be obtained by evaporation of condensate returned to the evaporation zone by line 24.

It is also possible in my process to employ substances other than the preferred lithium bromide as the absorbent and substances other than water as the evaporating refrigerant. The absorbent should be a substance which forms a low viscosity solution so as to minimize the work of pumping. The absorbent solution should also be of low corrosivity. The absorbent should have a low heat of dilution and concentration and should have good heat transfer characteristics, such as high thermal conductivity and high specific heat. It should, of course, have a strong absorbent affinity for the liquid refrigerant used in the process. Most absorbent substances having the indicated desired properties are salts and include the various halides of alkali metals and alkaline earth metals. While water is greatly preferred as the liquid refrigerant because of its cheapness and its many desirable properties, other liquids may also be suitable. Ethylene glycol is an example of a liquid which is suitable with certain absorbent salts.

The foregoing description of Figure 1 has mentioned my process and apparatus only in their application to a primary fractionating column, but my invention also has great advantages in its application to a plurality of fractionating columns employed in combination. Reference can be made to the apparatus of Figure 2 for further explanation of these advantages.

Figure 2 shows a debutanizer column 40 and a depropanizer 41 which are employed in combination with fractionating column 2 of Figure 1. The overhead product from column 2 is charged via line 32' to the debutanizer 40. In column 40 butanes and lighter vapors pass overhead via line 42 and heavier constituents are withdrawn from the bottom of the column via line 43. A portion of the heavier constituents is returned via line 44 through the reboiler 45 to reboil the column 40. The overhead vapors are cooled to the dew point of the desired overhead product by passage through condenser 46 which is cooled by ordinary cooling water. The partially condensed overhead product passes into drum 47 in which disengagement of vapors and liquid occurs. The condensed liquid is refluxed via line 48 to the top of column 40 and the uncondensed overhead product comprising butane and lighter vapors passes via line 49 to the depropanizer column 41.

In the depropanizer 41, propanes and lighter vapors pass overhead by line 50 and the heavier fraction is withdrawn from the bottom of the column by line 51. A portion of the heavier constituents is returned by line 52 through the reboiler 53 to reboil the column 41. Overhead product from column 41 passes through condenser 54 through the tubes of which chilled water flows. In condenser 54 the overhead vapors are cooled to the dew point of the desired overhead product, thus condensing the material which is heavier than the desired overhead product. In drum 55 disengagement of liquid and vapors takes place with the condensed liquids being refluxed by line 56 to the top of column 41 while the vapor product comprising propanes and lighter constituents is removed by line 57.

The refrigeration of condenser 54 is accomplished by passing chilled water from the refrigeration equipment of Figure 1 through line 33 into the tubes of condenser 54. It is possible in this way to maintain condenser 54 at a temperature of from about 40° to 50° F. This low condenser temperature then makes it possible to operate column 41 at a considerably lower pressure than a conventional depropanizer column which has its overhead condenser cooled by cooling water delivered at 85° F. Because of the reduced pressure in column 41 the temperature required to fractionate the mixture charged thereto is also considerably reduced. By reducing the pressure and temperature in column 41 it is possible also to accomplish the separation in column 40 at a considerably reduced pressure and temperature. It is not necessary to pass chilled water through the overhead condenser of column 40. Condenser 46 can be cooled by ordinary cooling water.

With the reduced temperatures in columns 40 and 41 it is of course possible to operate reboilers 53 and 45 at considerably lower temperaature levels than are possible in conventional debutanizer and depropanizer columns. In fact, it is now possible in accordance with my invention to supply the heat for reboiling columns 40 and 41 from waste heat in the liquid product streams from column 2 of Figure 1. In accordance with the preferred practice of my invention the various hot liquid product streams from column 2 such as the side streams 4 and 5, bottoms stream 6 and other side streams not shown in the drawing, are first heat-exchanged with the stream of crude oil being charged to column 2 in order to assist in preheating the charge before it is introduced into column 2. Thus the crude oil would be passed through heat-exchangers in the various side stream lines, passing first through the lowest temperature lines which would be those of the side streams near the top of the column and then successively through the heat-exchangers in the higher temperature side stream lines which are taken from successively lower levels in the column, the bottoms stream being the hottest. Ordinarily the temperature of the stream withdrawn through line 5 would be of such low level after passage through the generator coil 19 that it would not be profitable to heat-exchange this side stream with the charge.

The various side streams after preheating the crude oil can then be heat-exchanged with the reboilers of the subsequent fractionating columns. Thus, the side stream from line 4 is passed, after heat-exchange with the crude oil charge, into the tubes of reboiler 53 and the bottoms liquid from line 6, after heat-exchange with the crude oil, is passed through the coil of reboiler 45 thus supplying all heat required for reboiling columns 40 and 41.

The advantages of the above described operation in accordance with my invention of a primary fractionating column and absorption refrigeration system in combination with light ends removal columns can best be illustrated by comparison with conventional columns for removal of light ends. Thus, in conventional practice the overhead condensers of debutanizer and depropanizer columns are cooled by cooling water delivered at about 85° F. When such cooling water is used in the overhead condenser of the depropanizer the column must operate at a pressure of about 300 pounds per square inch gauge in order to maintain the overhead condenser at the dew point of the desired overhead product, which in the case of the depropanizer consists of propanes and lighter substances. When the depropanizer is operated at such high pressures, it is also necessary to operate the debutanizer at a pressure of about 200 to 250 pounds per square inch so that the debutanizer overhead condenser will be maintained at the bubble point of the desired overhead product which consists of butanes and lighter substances. The reason for this is that the entire overhead product which is charged to the depropanizer must be in the liquid state in order to avoid the expense of compressing vapors from the lower pressure of the debutanizer to the higher pressure of the depropanizer. As a consequence, it can be seen that both the depropanizer and debutanizer in the conventional practice must be of considerably more expensive construction than the corresponding vessels as used in accordance with my invention because of the much higher pressures required in the conventional vessels. It is also necessary, of course, to employ considerably higher fractionating temperatures in the conventional columns because of the higher pressures. Therefore, operating expenses are still further increased as compared with my process and apparatus.

From the foregoing description it can be seen that my invention makes possible an interrelated system comprising a primary fractionation column, light ends removal columns, and absorption refrigeration equipment. The absorption refrigeration equipment supplies chilled heat exchange liquid to the overhead condensers of the columns and itself is operated on waste heat from the primary fractionating column, the entire system being operated with great heat economy and making possible reduced construction costs of the equipment and reduced operating expense because of the moderate operating conditions in the fractionating columns.

Obviously many modifications and variations of the invention as hereinbefore set forth may be made without departing from the spirit and scope thereof and therefore only such limitations should be imposed as are indicated in the appended claims.

I claim:

1. The process which comprises continuously charging a heated wide boiling range fluid mixture to a fractionating column, continuously removing overhead from the fractionating column the most volatile fraction of the mixture as a vapor, continuously removing less volatile fractions of the mixture as liquid streams from the side and bottom of said column, cooling and at least partially condensing the overhead vapor by heat exchange with a refrigerant evaporating in an evaporation zone, imposing a partial vacuum in said evaporation zone to promote the vaporization of said refrigerant and maintaining the partial vacuum by continuously absorbing the vapors of said refrigerant in a stream of absorbent solution in an absorption zone connected with said evaporation zone, thus diluting said solution, passing said stream of diluted absorbent solution from the absorption zone to a generating zone, passing a hot liquid product stream from said fractionating column to heat exchange with the stream of diluted absorbent solution, thus generating refrigerant vapors and reconcentrating said solution, and passing other liquid streams from said fractionating column into heat exchange with said wide boiling range fluid mixture before its introduction to said fractionating column whereby to preheat said mixture.

2. The process which comprises subjecting a wide boiling range fluid mixture to primary fractionation in a first fractionating column, continuously removing overhead the most volatile fraction of the mixture as a vapor, continuously removing less volatile fractions of the mixture as liquid side streams and as a liquid bottom stream, cooling and at least partially condensing the overhead vapor by heat-exchange with an evaporating refrigerant, absorbing the vaporized refrigerant in an absorbent solution, thus diluting the absorbent solution, exchanging heat between the diluted absorbent solution and a liquid product stream of said fractionating column to heat the diluted solution, thus generating refrigerant vapor and reconcentrating said solution, passing the overhead product of said first fractionating column to a second fractionating column, continuously removing overhead as a vapor from said second column the more volatile fraction of the mixture charged thereto, cooling and at least partially condensing the overhead vapor from said second column, passing the overhead product from said second column to a third fractionating column, continuously removing overhead as a vapor from said third fractionating column the more volatile fraction of the mixture charged thereto, cooling and at least partially condensing the overhead vapor from said third column by heat-exchange with the aforementioned evaporating refrigerant, and reboiling said second and third fractionating columns by heat-exchanging recirculated liquid streams from the bottom of said columns with liquid product streams from said first fractionating column.

3. The process which comprises continuously charging a heated wide boiling range fluid mixture to a first fractionating column, continuously removing overhead the most volatile fraction of the mixture as a vapor, continuously removing less volatile fractions of the mixture as liquid side streams and as a liquid bottom stream, cooling and at least partially condensing the overhead vapor by heat-exchange with an evaporating refrigerant, absorbing the vaporized refrigerant in an absorbent solution, thus diluting the absorbent solution, exchanging heat between the diluted absorbent solution and a liquid product stream of said fractionating column to heat the diluted solution, thus generating refrigerant vapor and reconcentrating said solution, passing the overhead product of said first fractionating column to a second fractionating column, continuously removing overhead as a vapor from said second column the more volatile fraction of the mixture charged thereto, cooling and at least partially condensing the overhead vapor from said second column, passing the overhead product from said second column to a third fractionating column, continuously removing overhead as a vapor from said third fractionating column the more volatile fraction of the mixture charged thereto, cooling and at least partially condensing the overhead vapor from said third column by heat-exchange with the aforementioned evaporating refrigerant, preheating said wide boiling range fluid mixture before its introduction to said first fractionating column by heat-exchange with hot liquid product streams from said first fractionating column and reboiling said second and third fractionating columns by heat-exchanging recirculating liquid streams from the bottom of said columns with said liquid product streams from said first fractionating column after heat-exchanging such liquid product streams with said fluid mixture.

4. A fractionating system comprising a fractionating column, absorption refrigeration equipment, an overhead condenser for said column, means for delivering a continuous stream of chilled liquid from said absorption refrigeration equipment to said overhead condenser, an evaporating section in said refrigeration equipment for receiving said stream of chilled liquid after passage through said condenser and at least partially evaporating said liquid whereby to rechill the liquid portion thereof, an absorption section within said refrigeration equipment for providing contact between refrigerant vapors from said evaporating section and an absorbent solution, a generating section within said refrigeration equipment, heat-exchange means within said generating section, means for delivering diluted absorbent solution from said absorption section to said generating section, means for passing hot liquid from said fractionating column through the heat-exchange means within said generating section whereby to heat said diluted absorbent solution and generate refrigerant vapors, and means for delivering concentrated absorbent solution from said generating section to said absorption section for absorbing contact with refrigerant vapors from said evaporating section.

5. A fractionating system comprising a primary fractionating column, a plurality of secondary fractionating columns, absorption refrigeration equipment, an overhead condenser for said primary fractionating column, means for delivering a continuous stream of chilled liquid from said absorption refrigeration equipment to said overhead condenser, evaporating means in said refrigeration equipment for receiving said stream of chilled liquid after passage through said condenser and partially evaporating said liquid whereby to rechill the liquid portion thereof, an absorption section within said refrigeration equipment for providing contact between refrigerant vapors from said evaporating section and an absorbent solution, a generating section within said refrigeration equipment, heat-exchange means within said generating section, means for delivering diluted absorbent solution from said absorption section to said generating section, means for passing hot liquid from said primary fractionating column through the heat-exchange means within said generating section whereby to heat said diluted absorbent solution and generate refrigerant vapors, means for delivering concentrated absorbent solution from said generating section to said absorbent section for absorbing contact with refrigerant vapors from said evaporating section, a second fractionating column having a reboiler associated with the lower end thereof, means for delivering a side stream from said primary fractionating column to said reboiler for heat-exchange therewith, a third fractionating column having a reboiler associated with the lower end thereof and a condenser associated with the upper end thereof, means for delivering a stream of hot liquid from said primary column to reboil the third column, and means for delivering chilled liquid from said aforementioned refrigeration equipment to the overhead condenser of said third fractionating column.

References Cited in the file of this patent

UNITED STATES PATENTS

| | | |
|---|---|---|
| 1,561,899 | Barbet | Nov. 17, 1925 |
| 1,744,421 | Stroud, Jr., et al. | Jan. 21, 1930 |
| 2,127,004 | Nelson | Aug. 16, 1938 |
| 2,336,097 | Hutchinson | Dec. 7, 1943 |
| 2,461,513 | Berestneff | Feb. 15, 1949 |